United States Patent
Liang

(10) Patent No.: US 11,170,092 B1
(45) Date of Patent: Nov. 9, 2021

(54) DOCUMENT AUTHENTICATION CERTIFICATION WITH BLOCKCHAIN AND DISTRIBUTED LEDGER TECHNIQUES

(71) Applicant: UNITED SERVICES AUTOMOBILE ASSOCIATION (USAA), San Antonio, TX (US)

(72) Inventor: Minya Liang, Redmond, WA (US)

(73) Assignee: United Services Automobile Association (USAA), San Antonio, TX (US)

( * ) Notice: Subject to any disclaimer, the term of this patent is extended or adjusted under 35 U.S.C. 154(b) by 317 days.

(21) Appl. No.: 15/969,506

(22) Filed: May 2, 2018

Related U.S. Application Data

(60) Provisional application No. 62/598,904, filed on Dec. 14, 2017.

(51) Int. Cl.
| | | |
|---|---|---|
| *G06F 21/44* | (2013.01) | |
| *H04L 9/32* | (2006.01) | |
| *H04L 9/06* | (2006.01) | |
| *G06F 21/64* | (2013.01) | |
| *G06F 16/27* | (2019.01) | |

(Continued)

(52) U.S. Cl.
CPC .......... *G06F 21/44* (2013.01); *G06F 16/1805* (2019.01); *G06F 16/27* (2019.01); *G06F 21/645* (2013.01); *H04L 9/0637* (2013.01); *H04L 9/3213* (2013.01); *G06F 16/93* (2019.01)

(58) Field of Classification Search
CPC ...... G06F 21/44; G06F 16/27; G06F 16/1805; G06F 21/645; G06F 16/93; G06F 21/31; H04L 9/0637; H04L 9/3213
See application file for complete search history.

(56) References Cited

U.S. PATENT DOCUMENTS

| | | | |
|---|---|---|---|
| 2008/0320600 A1* | 12/2008 | Pandiscia | H04L 9/3297 726/27 |
| 2015/0332395 A1 | 11/2015 | Walker et al. | |
| 2015/0371224 A1 | 12/2015 | Lingappa | |

(Continued)

FOREIGN PATENT DOCUMENTS

| | | |
|---|---|---|
| AU | 2016101183 A4 | 9/2016 |
| CN | 105681301 A | 6/2016 |

(Continued)

OTHER PUBLICATIONS

Wolfgang Gräther "Blockchain for Education: Lifelong Learning Passport", Jul. 15, 2017, 8 pages, (Year: 2017).*

*Primary Examiner* — Chau Le
*Assistant Examiner* — Andrew Suh
(74) *Attorney, Agent, or Firm* — Fletcher Yoder P.C.

(57) ABSTRACT

Embodiments are described herein for document authentication certification using information stored on a distributed ledger such as a blockchain. A distributed ledger may securely store document data describing the document. Use of a distributed ledger may provide an immutable, readily auditable record of the history of the document. Each user participating in the system may be assigned a unique identifier to be used for conducting transactions on the distributed ledger network. A user may also be provided with a digital security token such as a cryptographic key that is useable to authenticate the user and enable access to the document data stored on the distributed ledger(s).

22 Claims, 10 Drawing Sheets

(51) Int. Cl.
*G06F 16/18* (2019.01)
*G06F 16/93* (2019.01)

(56) References Cited

U.S. PATENT DOCUMENTS

| | | |
|---|---|---|
| 2015/0379510 A1 | 12/2015 | Smith |
| 2016/0203477 A1 | 7/2016 | Yang et al. |
| 2016/0210626 A1 | 7/2016 | Ortiz et al. |
| 2016/0371771 A1 | 12/2016 | Serrano et al. |
| 2017/0046664 A1 | 2/2017 | Haldenby et al. |
| 2017/0046799 A1 | 2/2017 | Chan et al. |
| 2017/0053249 A1 | 2/2017 | Tunnell et al. |
| 2017/0076306 A1 | 3/2017 | Snider et al. |
| 2017/0103391 A1 | 4/2017 | Wilson, Jr. et al. |
| 2017/0109748 A1 | 4/2017 | Kote |
| 2017/0134161 A1 | 5/2017 | Goeringer et al. |
| 2017/0140375 A1 | 5/2017 | Kunstel |
| 2017/0221029 A1 | 8/2017 | Lund et al. |
| 2017/0228371 A1 | 8/2017 | Seger, II |
| 2017/0228704 A1 | 8/2017 | Zhou et al. |
| 2017/0228734 A1 | 8/2017 | Kurian |
| 2017/0230375 A1 | 8/2017 | Kurian |
| 2017/0236123 A1 | 8/2017 | Ali et al. |
| 2017/0237554 A1 | 8/2017 | Jacobs et al. |
| 2017/0243208 A1 | 8/2017 | Kurian et al. |
| 2017/0270527 A1 | 9/2017 | Rampton |
| 2017/0279783 A1 | 9/2017 | Milazzo et al. |
| 2017/0286717 A1 | 10/2017 | Khi et al. |
| 2017/0287068 A1 | 10/2017 | Nugent |
| 2018/0285217 A1* | 10/2018 | Smith ............... G06F 21/00 |
| 2019/0044727 A1* | 2/2019 | Scott ............... G06F 21/645 |
| 2019/0066205 A1* | 2/2019 | Marks ............... G06F 9/547 |
| 2019/0123889 A1* | 4/2019 | Schmidt-Karaca ... H04L 9/3236 |
| 2019/0166133 A1* | 5/2019 | Frederick ............ H04L 63/12 |

FOREIGN PATENT DOCUMENTS

| | | | |
|---|---|---|---|
| CN | 106097101 A | 11/2016 | |
| CN | 106228446 A | 12/2016 | |
| CN | 106339875 A | 1/2017 | |
| CN | 106355488 A | 1/2017 | |
| CN | 106408299 A | 2/2017 | |
| CN | 106452785 A | 2/2017 | |
| CN | 106453415 A | 2/2017 | |
| CN | 106485167 A | 3/2017 | |
| CN | 106530083 A | 3/2017 | |
| CN | 106790431 A | 5/2017 | |
| EP | 3413507 A1 * | 12/2018 | ........... G06F 21/645 |
| KR | 101590076 B1 | 2/2016 | |
| WO | 2015085393 A1 | 6/2015 | |
| WO | 2016154001 A1 | 9/2016 | |
| WO | 2017027648 A1 | 2/2017 | |
| WO | 2017065389 A1 | 4/2017 | |
| WO | 2017066715 A1 | 4/2017 | |
| WO | 2017091530 A1 | 6/2017 | |
| WO | 2017095036 A1 | 6/2017 | |
| WO | 2017136956 A1 | 8/2017 | |
| WO | 2017139688 A1 | 8/2017 | |

* cited by examiner

DOCUMENT AUTHENTICATION DONE url: http://localhost:3100/1513003318954.jpg hash: 0x363e0aeb9a743c3defef698e54c5a39
5c9750c571a22d6f03581428dda7e420c

[CREATE DOCUMENT] — 142
[DELETE DOCUMENT] — 156

— 144
— 146

---

CONSULATE-GENERAL OF THE PEOPLE'S REPUBLIC OF CHINA IN SAN FRANCISCO

[SEARCH] [AUTHENTICATE] ✓ — 148, 158

— QUERY DOCUMENT ON LEDGER —

DOC HOST: 363e0aeb9a743c3defef698e54c5a395c9750c571a22d6f03581428dda7e420c

URL: http://localhost:3100/1513003318954.jpg ✓  OWNER: 0x1a525707e2254d61d1dcc6e90x0c13cd679a6e4 — 170

CALCULATED DOC HASH: 363e0aeb9a743c3defef698e54c5a395c9750c571a22d6f03581428dda7e420c ✓ — 152

NO. OF NOTARIES: 3

— 162  — 166  — 164

| TIME | SIGNED BY | NAME |
|---|---|---|
| 12/11/2017.8:42:37 AM | 0x02946199805bea9a07db76ea45a937acb5712417 | JANE DOE, BEXAR NOTARY, TX |
| 12/11/2017.8:43:08 AM | 0x961edf12912d0802db348188a4606c6b6d520c | TEXAS SECRETARY OF STATE |
| 12/11/2017.8:43:44 AM | 0x2801ea039c63b5d43031ae5eadc93e9891739110 | CONSULATE GENERAL OF PRC, SAN FRANCISCO |

— 160

US 11,170,092 B1

DOCUMENT AUTHENTICATION CERTIFICATION WITH BLOCKCHAIN AND DISTRIBUTED LEDGER TECHNIQUES

CROSS-REFERENCE TO RELATED APPLICATION

This application claims priority to and the benefit of U.S. Provisional Patent Application No. 62/598,904, entitled "DOCUMENT AUTHENTICATION CERTIFICATION WITH BLOCKCHAIN AND DISTRIBUTED LEDGER TECHNIQUES," filed Dec. 14, 2017, which is hereby incorporated by reference in its entirety for all purposes.

BACKGROUND

The present disclosure relates generally to systems and methods for document authentication certification using blockchain and distributed ledger techniques.

In computer science, authentication refers to the process of confirming the identity of an individual or thing. The ways in which the identity of a person may be authenticated fall into three categories, based on what are known as the factors of authentication: something the user knows, something the user has, and something the user is. Each authentication factor covers a range of elements used to authenticate or verify a person's identity prior to being granted access, approving a transaction request, signing a document or other work product, granting authority to others, and establishing a chain of authority.

For legal documents that will be used in a different country, authentications and/or apostilles may be required to verify the genuineness of the document or signature in order for the document to be effective or valid. Current processes often take the form of a sealed or stamped certificate that confirms the authority of a public official (e.g., a judge or notary public) or of a signatory. Often, one document may require a series of authorities, each providing certification based on previous (lower level) certification history. Current processes often involve a document owner bringing the document to each level of the authentication certification chain to get the proper stamp, either in person or via mail, which can be expensive, labor intensive, and time consuming, and even subjected to document loss. In addition, the particular way each authority issues the authentication certificate may be inconsistent, and vulnerable to accidental invalidation by user mistake, etc.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

Embodiments of this disclosure include blockchain systems, application programming interfaces (APIs), smart contract data structures, and methods of operation thereof, that may be used to implement and/or operate a distributed ledger system that includes one or more distributed ledgers for storing data relating to one or more documents. The data includes one or more authentication certifications for the respective document. The use of a blockchain infrastructure to implement a document authentication certification system may allow a publicly accessible, tamper-proof, resilient, and auditable platform for storage and tracking of the operations. The use of smart contracts, such as the ones described herein, may further allow the document authentication certification system to perform several operations automatically, in a transparent manner.

In an embodiment, a blockchain node of a blockchain system is provided. The blockchain node includes a blockchain replicate and blockchain mining instructions that cause processing circuitry of the blockchain node to replicate a blockchain, perform requested data insertion into the blockchain replicate, perform requested transactions in the blockchain replicate, and perform a consensus mechanism of the blockchain system. The blockchain replicate includes a document authentication certification smart contract configured to facilitate insertion of data relating to one or more documents in the blockchain. In addition, the data includes one or more authentication certifications for the one or more documents.

In another embodiment, a non-transitory computer readable medium that includes instructions for an access node of a blockchain system is provided. The instructions are configured to cause processing circuitry of the access node to create a document authentication certification smart contract. The document authentication certification smart contract is configured to facilitate insertion of data relating to one or more documents in a blockchain of the blockchain system. In addition, the data includes one or more authentication certifications for the one or more documents.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 5A through 5F are depictions of an example user interface that may facilitate interaction with the system described herein, in accordance with embodiments described herein.

DETAILED DESCRIPTION

Figure 1:
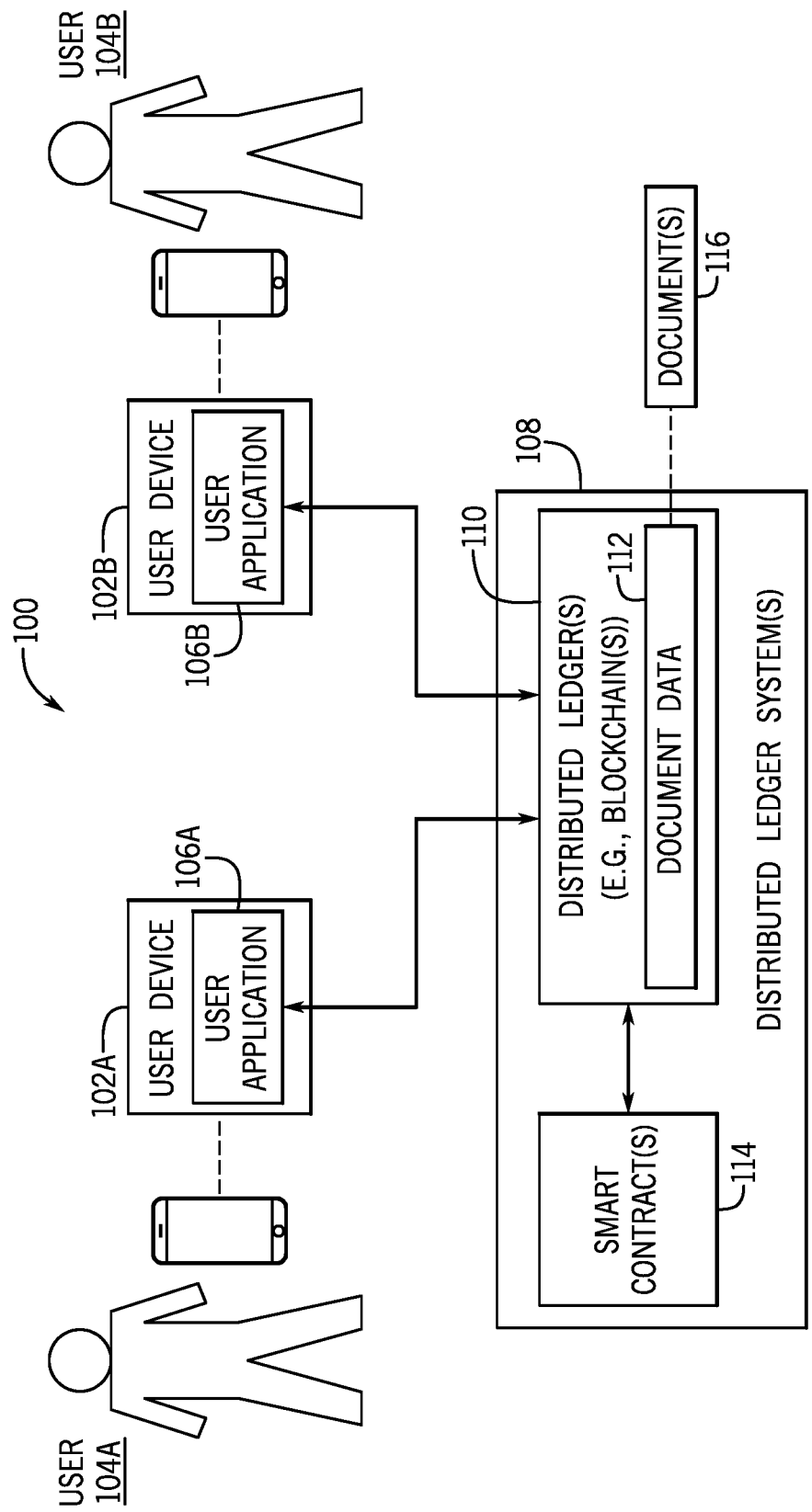
FIG. 1 illustrates a block diagram of a system for managing documents using a distributed ledger, in accordance with embodiments described herein.

Embodiments of the present disclosure utilize blockchain and distributed ledger techniques as a shared infrastructure that connects all the parties involved (e.g., document owner(s) and various authoritative entities, like notary public, the state department, foreign consulates/embassies, other government entities, and so forth), and utilize the immutable nature of the distributed ledger to track the authentication certification history of a single document in electronic form, with a verifiable identity of each certifying entity. Using the embodiments described herein, the entire certification history of a single document may be tracked and verified on the blockchain/distributed ledger. Doing so, among other things, reduces the time to get document authentication certification from multiple authorities from days or weeks down to minutes, saves cost of mailing and fees for representative services, eliminates the risk of important documents getting lost, and reduces fraud risks.

Embodiments of the present disclosure provide many other advantages. Because the embodiments described herein employ distributed ledgers (e.g., blockchains) to store and publish information regarding particular documents, the document data is immutable and less prone to fraud, destruction, or corruption compared to document data stored on traditional storage systems. Accordingly, the embodiments described herein avoid the expenditure of processing, memory, storage, networking, and/or other computational resources that may be used when traditional systems attempt to restore document data that has been lost or corrupted. Similarly, by providing a more secure and reliable mechanism for managing certified documents, the embodiments described herein avoid the expenditure of computing resources that may be used when traditional systems are required to back out or otherwise reverse fraudulent or erroneously performed document transfers. Moreover, through the utilization of smart contracts and/or side chains, certain embodiments significantly increase the speed at which document transactions occur, compared to traditional systems. The embodiments described herein also increase the speed of transfer processing by related components and/or systems, such as title search systems, legal support systems, systems of government agencies (e.g., building agencies, title registrars, etc.), mortgage lender systems, and so forth. Moreover, by managing documents through distributed ledger system(s), the embodiments described herein provide superior electronic provenance compared to human operated systems.

Embodiments of the present disclosure are directed to systems, devices, methods, and computer-readable media for managing certification of certain documents (e.g., legal documents, such as oaths, affidavits, declarations, jurats, assignments of legal rights, lease agreements, sales agreements, loan agreements, powers of attorneys, deeds, articles of incorporation, partnership agreements, and other contracts and business, commercial, or personal legal documents) using information stored on a distributed ledger (e.g., a blockchain). The embodiments described herein employ a distributed ledger, such as a blockchain, to securely store document data describing, for example, the current possessor(s) of a document, the previous possessor(s) of the document, the history of transfers of the document, and/or other information regarding the document. Use of a distributed ledger may provide an immutable, readily auditable record of the "chain of custody" of the document (i.e., as the document is processed among one or more processor(s) of the document). Advantages of the embodiments of the present disclosure include, but are not limited to, obviating the need to maintain physical copies of legal documents and, rather, facilitating the ability of provide immutable, readily auditable records of authentication certification histories for electronic documents. However, it will be appreciated that the embodiments described herein may also be used to provide immutable, readily auditable records of authentication certification histories for physical documents.

The embodiments described herein provide systems for tracking the authentication certification history of documents using the document data stored on distributed ledger(s). Each user participating in the systems may be assigned a unique identifier (ID) to be used for conducting transactions on the blockchain network. For example, in certain embodiments, a user may be provided with a digital security token that is useable to authenticate the user and enable access to the document data stored on the distributed ledger(s). In certain embodiments, a user may claim possession of a document, and the document may be digitally represented as an image of a physical (e.g., printed) document, and/or any other suitable information that digitally represents the document. The document data may be published to and/or stored on the distributed ledger. In certain embodiments, a particular distributed ledger (e.g., blockchain) may be associated with a particular document, and may store document data regarding that document.

In certain embodiments, the distributed ledger may be accessed to manage the transfer of a document from one entity (e.g., document owner(s) and various authoritative entities) to another. In certain embodiments, a transaction describing the possession of a document may be added to the (e.g., append-only) structure of the distributed ledger. In certain embodiments, if a user wants to transfer possession of the document to another user, the current possessor may publish a transaction that transfers the digital representation of the physical document to the new possessor. The new possessor would then possess the document, and the transfer of the document may be verified by showing the transaction of proof of document digest that was published to the distributed ledger.

In general, the embodiments described herein utilize blockchain and distributed ledger techniques, as well as smart contracts in certain embodiments, to track a verifiable history of document possessors (e.g., document owners, document certifying authorities, and so forth), authentication certification history, with the potential for automated document routing based on document origin, type, and destination of consumption (e.g., legal entity that manages records of certain types of documents, such as title recordation authorities, government agencies, and so forth). FIG. 1 illustrates a block diagram of a system 100 for managing documents 116 using a distributed ledger 110, in accordance with the embodiments described herein. As illustrated in FIG. 1, the system 100 may include one or more user devices 102 that are each owned by, operated by, or otherwise associated with a user 104, which may be a document owner, document certifying authorities, and so forth. The user device(s) 102 may include any appropriate type of computing device, such as portable device(s) (e.g., smartphones, tablet computers, wearable computers, etc.) and less mobile device(s) (e.g., desktop computers). The user devices 102 may execute a user application 106 that enables the user 104 to access and/or modify document data 112 for one or more document(s) 116, which may be stored on one or more distributed ledger(s) 110. The distributed ledger(s) 110 may be implemented on one or more distributed ledger systems 108. The distributed ledger system(s) 108 may include any appropriate type and number of computing device(s), such as server computer(s) and/or distributed computing device(s) (e.g., cloud server(s)). The distributed ledger system(s) 108 may communicate with the user device(s) 102 and/or other computing device(s) over one or more communication networks.

In certain embodiments, the distributed ledger system(s) 108 may execute one or more smart contracts 114. The smart contract(s) 114 may include executable logic that updates the document data 112 stored on the distributed ledger(s) 110. Updates may be made by writing transaction(s) to the append-only structure of the distributed ledger(s) 110. In certain embodiments, the smart contract(s) 114 may apply logic, e.g., according to one or more rules, to update the document data 112. For example, the smart contract(s) 114 may apply logic to manage the transfer of a document 116 from a first user 104A to a second user 104B, by publishing a transaction that indicates the transfer of possession of the document 116 (e.g., for the purpose of certifying the document 116) on the distributed ledger(s) 110. The users 104 may be single users, groups of users, or other entities, such as corporations and government agencies. In certain embodiments, a user 104 may be a Decentralized Autonomous Organization (DAO) including one or more autonomous artificial intelligence (AI) agents that perform operations and make decisions regarding the management of a particular document 116.

In certain embodiments, the document data 112 may be published on a distributed ledger 110 that is particularly associated with the document 116. For example, each document 116 may be associated with its own distributed ledger 110 that includes published document data 112 related to the corresponding document 116. In certain embodiments, the document 116 may be a unique tangible document that exists in the physical world, and the document data 112 may digitally represent that document 116 in the distributed ledger system(s) 108. However, in other embodiments, the document 116 may be a digital document, and the distributed ledger 110 may store a link to a location of the document 116, for example, on a server accessible via a communication network, in cloud storage accessible via the communication network, or any other accessible location for the digital document.

By storing and publishing the document data 112 on a distributed ledger 110 (e.g., blockchain) that is secure and append-only, such that information may be added to, but not deleted from, the distributed ledger 110, certain embodiments may ensure that the document information is not corrupted or fraudulent. Moreover, by storing the document data 112 on a distributed ledger 110 that is distributed across multiple distributed ledger system(s) 108, certain embodiments may reduce or eliminate the chance that the document data 112 may be irrecoverably lost or destroyed, either intentionally or unintentionally during a natural disaster, fire, war, or other catastrophic event. As such, the distributed ledger(s) 110 may provide security, traceability, and/or metadata to be used to settle challenges against, for example, the authentication certification for a particular document.

In certain embodiments, the document data 112 on the distributed ledger(s) 110 may be secured and accessible only to users 104 with appropriate digital security tokens. The use of a distributed ledger 110 (e.g., a blockchain) to store the document data 112 may provide further security due to the characteristics of the distributed ledger 110. For example, the distributed ledger 110 may provide (e.g., built-in) security to ensure access is only granted to those users 104 with approved addresses and/or digital security tokens. The document data 112 may be stored in a (e.g., unique) record on the distributed ledger 110, and such a record may be verifiable by multiple sources. The distributed nature of the distributed ledger(s) 110 may prevent the document data 112 from being inadvertently or deliberately destroyed.

In certain embodiments, when a user 104A seeks to transfer a document 116 to another user 104B, the user 104A may access the distributed ledger 110 for the document 116 to retrieve evidence that the user 104A is the current possessor of the document 116. Accordingly, the document data 112 published by the distributed ledger 110 may provide confirmation that the chain of custody is sound, without gaps or inconsistencies. In certain embodiments, the current possessor (e.g., user 104A may be able to access the document data 112 but the document data 112 may generally be locked and inaccessible by other users 104. Accordingly, to facilitate a transfer of the document 116, the document data 112 may be temporarily unlocked to enable access by another user (e.g., user 104B). Based at least partly on their examination of the document data 112, the other user 104 may take possession of the document 116. The user application(s) 106 and/or other software module(s) may generate a transaction that updates the document data 112 to indicate transfer of the document 116. The transaction may also update the document data 112 to include other information relating to the document 116, for example, the certifications that have been performed for the document 116.

Each of the user(s) 104 may have a digital security token that is useable to request access and/or updates to the document data 112 published by the distributed ledger(s) 110. In certain embodiments, the digital security token may be a cryptographic key (e.g., a private key) that is unique to a user 104. One or more private keys may be issued to one or more users 104 who enable their access to the distributed ledger 110. The private key(s) may each be associated with a public key corresponding to a particular distributed ledger 110, and each of the private keys may be employed with the public key to gain access to the distributed ledger 110. In certain embodiments, other credential(s) may also be used to control access to the distributed ledger(s) 110. For example, in certain embodiments, a user 104 may login to the user application 106 using a username, password, personal identification number (PIN), and/or other credentials. The private key of the user 104 may be stored on the user device 102, and the private key may be employed by the user application 106 to access the distributed ledger(s) 110 through a private-public key validation handshake.

As described in greater detail herein, in certain embodiments, the distributed ledger system(s) 108 may execute smart contract(s) 114 that act as an AI intermediary between the users 104. In certain embodiments, the smart contract(s) 114 may automatically perform operations according to preprogrammed rules that govern the transfer of a document 116, for example, a predetermined set of multiple certifying entities. Such rule(s) may be enforced by the smart contract 114. In certain embodiments, the smart contract(s) 114 may include logic to verify whether a particular certification of a particular document 116 published on the distributed ledger(s) 110 is correctly formed (e.g., legally correct). The smart contract(s) 114 may also perform operations to detect possible fraudulent updates to the document data 112. For example, the smart contract(s) 114 may access sensor data, such as global positioning system (GPS) coordinates of the user device 102 being employed, to access the distributed ledger(s) 110, and compare that location to a previously detected or otherwise typical location of the user 104. Discrepancies in the location information from various sources may indicate possible fraud.

In certain embodiments, a federated identity model may be supported. The federated identity model may enable a user's identity to be verified based on the certification of an authority such as a bank, credit bureau, and so forth. In such embodiments, a user 104 may request access to the distributed ledger 110 for a document 116, and the authority may confirm that the digital security token (e.g., key) supplied by the user 104 corresponds with the previously established identity of the user 104. In certain embodiments, instead of or in addition to a federated identity model, other data may be employed to authenticate the user 104. Such other data may be unique to the user 104. For example, the user 104 may be authenticated based at least partly on biometric data such as fingerprints, retinal maps, brainwave patterns, and so forth. In such instances, the biometric data may be collected by the distributed ledger system(s) 108 using sensor device(s) that are in proximity to the user 104 and that are known to be trusted (e.g., secured against spoofing or other compromise). Such sensor(s) may be at a particular location, such as at a bank, title agency, government office, and so forth, and may be trusted to collect biometric data that is accurate and not spoofed. In such instances, the user 104 may be required to travel to the particular location of the sensor(s) to perform operations to update the document data 112. In general, certain embodiments support authentication of the user(s) 104 using any suitable number of authentication factors including but not limited to cryptographic keys or other digital security tokens, other credentials (e.g., username, password, PIN, challenge questions, etc.), biometric data, location information, and so forth.

In certain embodiments, the smart contract(s) 114 may make decisions regarding which user(s) 104 are allowed to access and/or update the document data 112 published on the distributed ledger(s) 110. The smart contract(s) 114 may morph the methods employed to authenticate user(s) 104 depending on the particular circumstances and/or context of the access requests. For example, a smart contract 114 may determine that there is a likelihood that an access request for document transfer is fraudulent (e.g., that the user 104 is not who they purport to be). In such instances, the smart contract 114 may require biometric data to be collected regarding the user 104, to verify their identity. Moreover, the smart contract 114 may access other sensors that are in proximity to the user's purported location. Such sensors may capture images, audio data, air samples, hair samples (e.g., for DNA analysis), and/or other information to verify the user's identity and/or presence at a particular location. In certain embodiments, the smart contract(s) 114 may employ machine learning techniques to adjust (e.g., morph) the authentication methods that it employs to authenticate a user 104. The machine learning may be employed to determine a set of factor(s) to be employed to authenticate a user 104 given a particular set of circumstances, where the set of factor(s) minimizes the likelihood of fraud under such circumstances.

In certain embodiments, the user application 106 may provide an interface that enables a user 104 to access the document data 112 to request transactions to update the document data 112 (e.g., to facilitate a particular certification of a particular document). In certain embodiments, the interface may be a component of a wallet (e.g., cryptocurrency wallet) that executes on the user device 102. In certain embodiments, in response to a user 104 logging into the user application 106, the interface may present ID(s) for the various document(s) 116 associated with the user 104 (e.g., document(s) 116 for which the user 104 is a current possessor of the document(s) 116 and/or an interested party in the document(s) 116, such as a document owner). The user 104 may select (e.g., click on) a presented document ID and, in response, the user application 106 may employ the user's digital security token (e.g., key) to access the distributed ledger 110 that stores document data 112 for the selected document 116. The document data 112 may then be retrieved and presented via the interface. The interface may also present various controls or other user interface elements to enable the user 104 to initiate and/or approve transfer of the document 116, or otherwise update the document data 112 (e.g., certifying the document 116, or otherwise processing the document 116).

In certain embodiments, a smart contract 114 may manage the transfer of the document 116 in response to the requests of the user(s) 104. In some instances, the smart contract 114 may impose a waiting period (e.g., hour(s), day(s), etc.) between the request for the transfer and the completion of the transfer. In certain embodiments, during the waiting period, the smart contract 114 may perform further operations to confirm the identities of the user(s) 104, and/or otherwise provide safeguards that the transfer is not fraudulent.

In certain embodiments, the distributed ledger system 108 includes distributed ledger(s) 110 that include one or more blockchains, which can include a transaction database shared by all nodes participating in a system based on a predefined protocol (e.g., the BitCoin™ protocol). In certain embodiments, the blockchain may be a publicly available blockchain (e.g., available to any and every entity/user on a network, such as the internet). In other embodiments, the blockchain may be a private blockchain (e.g., available to one or more entities/users that are credentialed users on a network). In yet other embodiments, the blockchain may be a hybrid blockchain (e.g., public and private).

In accordance with certain embodiments of the present disclosure, each interaction event may be encrypted before being stored to the distributed ledger system 108. In some examples, interaction events can be retrieved and decrypted by credentialed user(s) 104. For example, interaction events of persons may be recorded in a respective interaction event record on the distributed ledger system 108, and may be encrypted using a private-public key encryption scheme. For example, a user 104A may grant another user 104B access to interaction events (e.g., all interaction events, a sub-set of interaction events, and so forth) recorded on the distributed ledger system 108, the users 104 may retrieve the interaction events that they have been granted access to (e.g., using one or more predefined credentials), and may decrypt the retrieved interaction events based on the implemented encryption scheme. Because the interaction events, and underlying transaction detail, are provided from the distributed ledger system 108, the accuracy of the interaction event (and transaction detail(s)) can be considered accurate/trustworthy.

Figure 2:
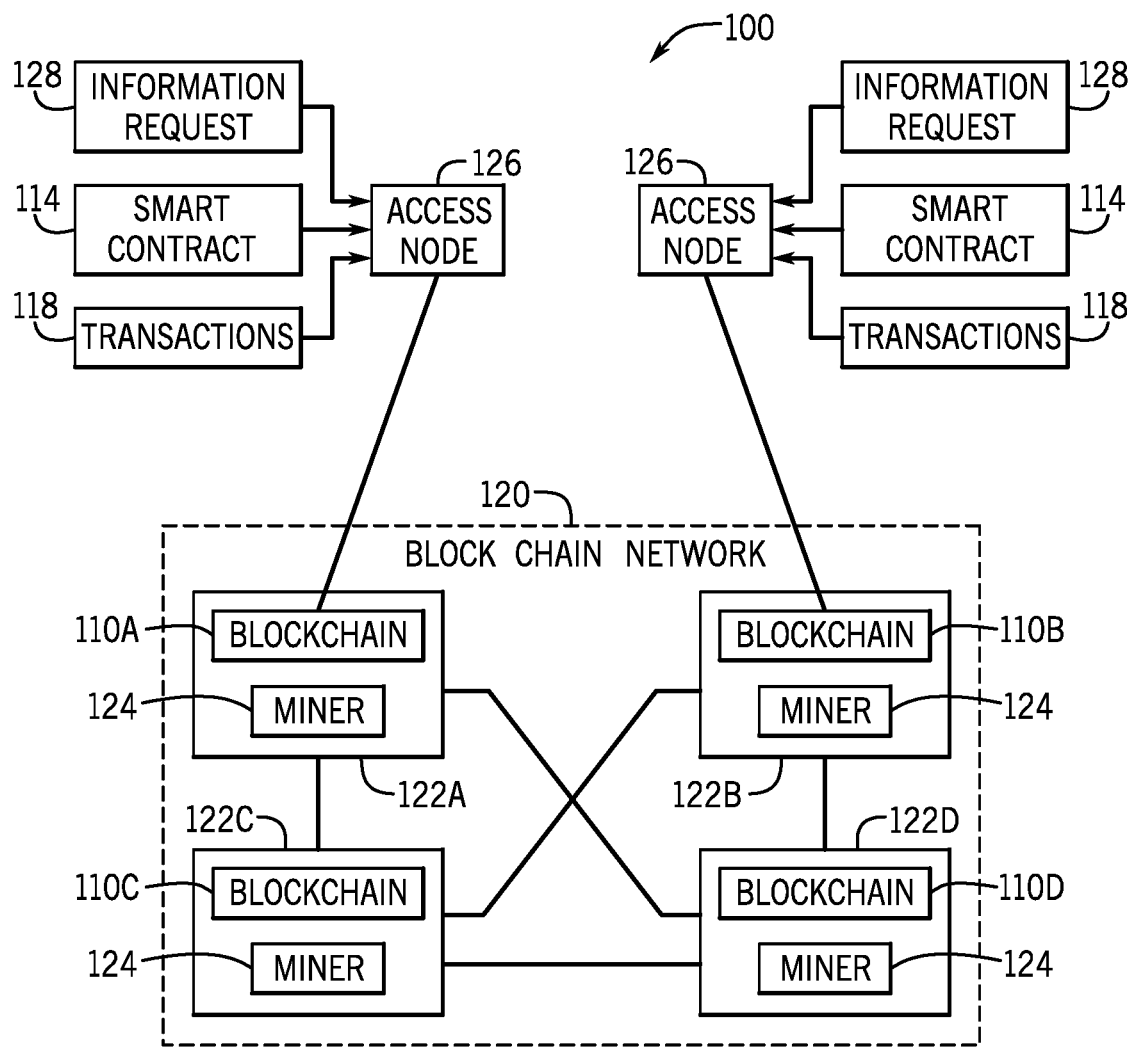
FIG. 2 is an illustration of a blockchain and smart contract infrastructure that may be used to aggregate information relating to authentication certification of documents, in accordance with embodiments described herein.

To provide further context for the present disclosure, a high-level discussion of blockchain technology is provided with reference to FIG. 2. In general, a blockchain 110 is a public ledger of all transactions 118 that have ever been executed in one or more contexts (e.g., documents in the present context). A blockchain 110 constantly grows as completed blocks are added with a new set of transactions 118. In some examples, a single block is provided from multiple transactions 118. In general, blocks are added to the blockchain 110 in a linear, chronological order by one or more computing devices in a peer-to-peer network 120 of interconnected computing devices that execute a blockchain protocol. In short, the peer-to-peer network 120 can be described as a plurality of interconnected nodes 122, each node 122 being a computing device that uses a client to validate and relay transactions 118. Each node 122 maintains a copy of the blockchain 110, which is automatically downloaded to the node 122 upon joining the peer-to-peer network 120. The blockchain protocol provides a secure and reliable method of updating the blockchain 110, copies of which are distributed across the peer-to-peer network 120, without use of a central authority.

Because all users 104 generally need to know all previous transactions 118 to validate a requested transaction 118, all users 104 must agree on which transactions 118 have actually occurred, and in which order. For example, if two users 104 observe different transaction histories, they will be unable to come to the same conclusion regarding the validity of a given transaction 118. The blockchain 110 enables all users 104 to come to an agreement as to transactions 118 that have already occurred, and in which order. In short and as described in further detail herein, a ledger of transactions 118 is agreed to based on the amount of work required to add a transaction 118 to the ledger of transactions 118 (e.g., add a block to the blockchain 110). In this context, the work is a task that is difficult for any single node 122 (e.g., computing device) in the peer-to-peer network 120 to quickly complete, but is relatively easy for a node 122 (e.g., computing device) to verify.

The peer-to-peer network 120 also includes so-called miners 124 (e.g., computing devices) that add blocks to a blockchain 110 based on the blockchain protocol. In general, multiple miners 124 validate transactions 118 that are to be added to a block, and compete (e.g., perform work, as described above) to have their block added to the blockchain 110. Validation of transactions 118 includes verifying digital signatures associated with respective transactions 118. For a block to be added to the blockchain 110, a miner 124 must demonstrate a proof of work before their proposed block of transactions 118 is accepted by the peer-to-peer network 120, and is added to the blockchain 110. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value in that the hash value cannot be "un-hashed" to determine what the input was. The blockchain protocol can require multiple pieces of information as input to the CHF. For example, the input to the CHF can include a reference to the previous (most recent) block in the blockchain 110, details of the transaction(s) 118 that are to be included in the to-be-created block, and a nonce value (e.g., a random number used only once).

As described herein, multiple nodes 122 compete to hash a set of transactions 118 and provide the next block that is to be added to the blockchain 110. The blockchain protocol provides a threshold hash to qualify a block to be added to the blockchain 110. For example, the threshold hash can include a predefined number of zeros (0s) that the hash value must have at the beginning (e.g., at least the first four characters of the hash value must each be zero). The higher the number of zeros, the more time-consuming it is to arrive at a qualifying hash value.

In accordance with the blockchain protocol, each miner 124 in the peer-to-peer network 120 receives transaction information for one or more transactions 118 that are to be included in a block that is to be added next in the blockchain 110. Each miner 124 provides the reference to the previous (most recent) block in the blockchain 110, details of the transaction(s) 118 that are to be included in the to-be-created block, and the nonce value, to the CHF to provide a hash value. If the hash value does not meet the threshold hash (e.g., the first four characters of the hash value are not each zero), the miner 124 starts again to provide another hash value. If the hash value meets the threshold hash (e.g., at least the first four characters of the hash value are each zero), the respective miner 124 successfully created the next block that is to be added to the blockchain 110. Consequently, the respective miner's block is broadcast across the peer-to-peer network 120. At this point, all other miners 124 cease work (because one miner was already successful), and all copies of the blockchain 110 are updated across the peer-to-peer network 120 to append the block to the blockchain 110. Each miner 124 may be required to produce hundreds or thousands of hash values before any one miner 124 provides a qualifying hash value (e.g., at least the first four characters of the hash value are each zero).

In certain embodiments, the distributed ledger system(s) 108 described herein may include one or more sidechains. A sidechain can be described as a blockchain 110 that validates data from other blockchains 110. In some examples, a sidechain enables ledger objects (e.g., a digital currency) to be transferred between multiple blockchains 110.

With the foregoing in mind, the blockchain network 120 may be formed by several blockchain nodes 122, such as the example blockchain nodes 122A, 122B, 122C, and 12D. Each blockchain node 122 may be implemented using a dedicated server or computer device, or may be implemented as a virtual machine in a shared computer system. Each blockchain node 122 may store and/or interact with the blockchain ledger 110. To that end, each blockchain node 122 may include a replicate of the blockchain ledger 110. Through access nodes 126, an application programming interface (API) 130 may interact with a smart contract 114. As described herein, interaction with the smart contract 114 may include deployment, execution of information requests 128 and transactions 118. An information request 128 may refer to a request to retrieve a state of the smart contract 114. A transaction request 118 may also refer to a request to change the state of the smart contract 114.

As described herein, in certain embodiments, the smart contracts 114 may be in the blockchain ledger 110. As also described herein, the blockchain ledger 110 may be a replicated data structure. The consistency and integrity of the blockchain ledger 110 may be preserved by a consensus mechanism performed by the miners 124. In the blockchain infrastructure 120, the miners 124 may refer to processing units of the blockchain network 120 that may mine blocks in the blockchain ledger 110, accept, and/or replicate the mined blocks in the blockchain ledger 110. Through the process of mining, the miners 124 may create an update to the blockchain ledger 110 that persists the new state of the smart contract 114 to the blockchain ledger 110. Updates to the blockchain ledger 110 may occur in response to a transaction 118.

Examples of smart contracts 114 described herein include smart contracts that may record information relating to document authentication certification. Following deployment of the smart contract(s) 114, each blockchain node 122 may propagate its update of the blockchain ledger 110 and the other nodes 122 of the network 120 may accept the update using a consensus mechanism (e.g., proof of work, proof of stake, etc.). For example, if a miner 124 generates a block (e.g., a blockchain segment) that incorporates changes to the smart contract 114 to a blockchain ledger 110, the miner 124 may propagate, validate, and/or accept the updated blockchain ledger 110.

Similarly, a transaction request 118 may be received by any miner 124 of the blockchain nodes 122. The transaction request 118 may include calls to functions of the smart contract 114, to perform operations that cause a change to a state of a smart contract 114 recorded in the blockchain ledger 110, and so forth. After performing the function of the smart contract 114, which may cause a change to the state of the smart contract 114, in accordance with the transaction request 118, the miner 124 may update the blockchain ledger 110 to record the updated state of the smart contract 114. Changes to the blockchain ledger 110 may be validated and replicated by other miners 124 through the consensus mechanism 122. An information request 128, similar to a transaction request 118, may be a call to a function of the smart contract 114. However, in contrast with the transaction request 118, the function of the smart contract 114 that is called by information request 128 does not lead to changes in the state of the smart contract 114 and, thus, no update to the blockchain ledger 110 results from a successful information request 128.

In certain embodiments, performance of the operations by the miners 124 of the nodes 122 may be incentivized and/or regulated by exchange of tokens (e.g., currencies) of the blockchain. In public blockchains, updates to the blockchain ledger 110 by a blockchain node 122, from recording a smart contract 114 or from performing a transaction request 118, may be rewarded with a blockchain token. Moreover, performance of a transaction request 118 or an information request 128 may be rewarded with a blockchain token. For example, in the Ethereum public blockchain, updates to the blockchain from recordation of smart contracts 114 and information requests 128 may be rewarded with Ether tokens, and performance of transaction requests 118 and information requests 128 may be incentivized by offers of Ether in the form of Gas. The Gas mechanism may be used to implement prioritization mechanisms for the operations and/or to prevent large or faulty operations from blocking the blockchain with arbitrarily long operation times.

Figure 3:
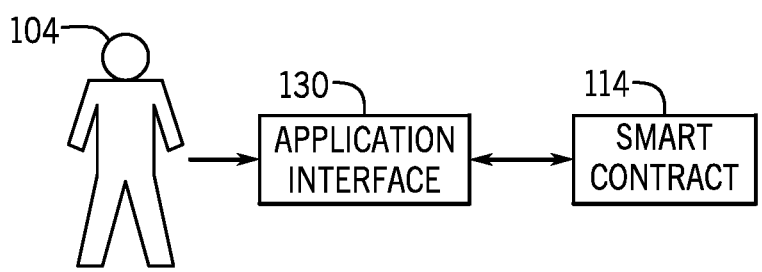
FIG. 3 is an illustration of an application program interface (API) that may be used to interact with smart contracts, in accordance with embodiments described herein.

The blockchain infrastructure 120 described above with respect to the system 100 illustrated in FIG. 2 may be accessed by a document authentication certification programming interface 130 (API), as illustrated in FIG. 3. As discussed with respect to FIG. 2, the API 130 may be accessed from an access node 112. The API 130 may provide users 104 with an interface to the blockchain network 102. The API 130 may be loaded as an interface in an access node 112, or a resource available on the internet that may be accessed using an application 106 (e.g., a browser) in a computing device, such as the user devices 102 illustrated in FIG. 1. The API 130 may provide tools for creation and interaction with document authentication certification smart contracts 114. For example, the API 130 may convert the state and the functions of a document authentication certification smart contract 114 to binary code for storage and execution by miners 124 of the blockchain 110. The API 130 may also convert (e.g., compile) transactions 118 or information requests 128 to binary messages that may be transmitted to the blockchain 110 for execution by miners 124.

Document authentication certification smart contracts 114 are smart contracts that may be used to store and track historical information for documents, including a history of authentication certifications for the documents. In certain embodiments, the document authentication certification smart contracts 114 may employ tokens. In such systems, transference of tokens and issuance of tokens may also be part of the blockchain 110. The document authentication certification system 100 may operate in a dedicated blockchain network (e.g., that stores only documents associated with the document authentication certification system 100) or a shared blockchain network. Moreover, as discussed above, the blockchain network 120 may be private or public (e.g., the Ethereum network or the bitcoin network, among others).

The users 104 may access the document authentication certification smart contracts 114 of the document authentication certification system 100 using the APIs 130, which obey the interaction protocols established by the document authentication certification smart contracts 114. Customization of the APIs 130 may allow integration between the document authentication certification system 100 and other internal applications of an organization that wishes to access the document authentication certification system 100. Such flexibility does not decrease security of the document authentication certification system 100 as the only allowed changes in the state of the document authentication certification smart contracts 114 are performed using transactions 118 processed by the particular document authentication certification smart contract 114.

In certain embodiments, the API 130 may include the option for signing document authentication certification smart contract transactions 118. The signature of the document authentication certification smart contract transaction 118 may include encryption methods using a public/private key infrastructure. For example, a user 104 may have a private key to sign the document authentication certification smart contract transaction 118, which provides proof that the document authentication certification smart contract 114 was originated by the user 104. Moreover, public/private key infrastructure may also be used to encrypt transactions 118 and prevent unauthorized access. For example, a user 104 may encrypt a transaction parameter using a public key of the document authentication certification smart contract 114 to produce a transaction 118 that can only be readily understood by the smart contract 114. Furthermore, in certain embodiments, the electronic version(s) of the document(s) 116 themselves may be encrypted in a similar fashion, for example, when transmitted (e.g., for creation of the document 116, display of the document 116, and so forth).

To interact with a document authentication certification smart contract 114, a user 104 may specify a document authentication certification smart contract 114, and the API 130 may provide a list of member functions of that smart contract 114. The user 104 may then chose the member function, and provide inputs or parameters associated with the function. The API 130 may inform the user 104 that the document authentication certification smart contract 114 may have, among other transactions 118 and information requests 128, functions to query document(s) 116, to create a new instance of a document 116, to display a document 116, to authenticate a document 116, to delete a document 116, and so forth. Details of the state and of the transactions 118 and information requests 128 of the document authentication certification smart contracts 114 of the document authentication certification system 100 are provided below. It should be noted that certain transactions 118 and information requests 128 may require a digital signature for authorization, in certain embodiments. Digital signatures may use the same above-discussed public/private key.

To perform transactions 118, the API 130 may provide an option for the amount of Gas that a user 104 is willing to use to incentivize performance of the transaction 118, as described above. The API 130 may request performance of the transaction 118 to the blockchain 110. The API 130 may receive from the blockchain 110 the results of the transaction 118, which may include an output of the transaction 118, an acknowledgment of execution and/or an indication of failure, when the transaction 118 causes an error, if the amount of Gas was insufficient to finalize the operation, and so forth. It should be understood that the API 130 may provide an interactive user interface that may be accessed by a human user or an executable library. The executable library facilitates access to the document authentication certification system 100 by other applications in the user computation environment.

Figure 4:
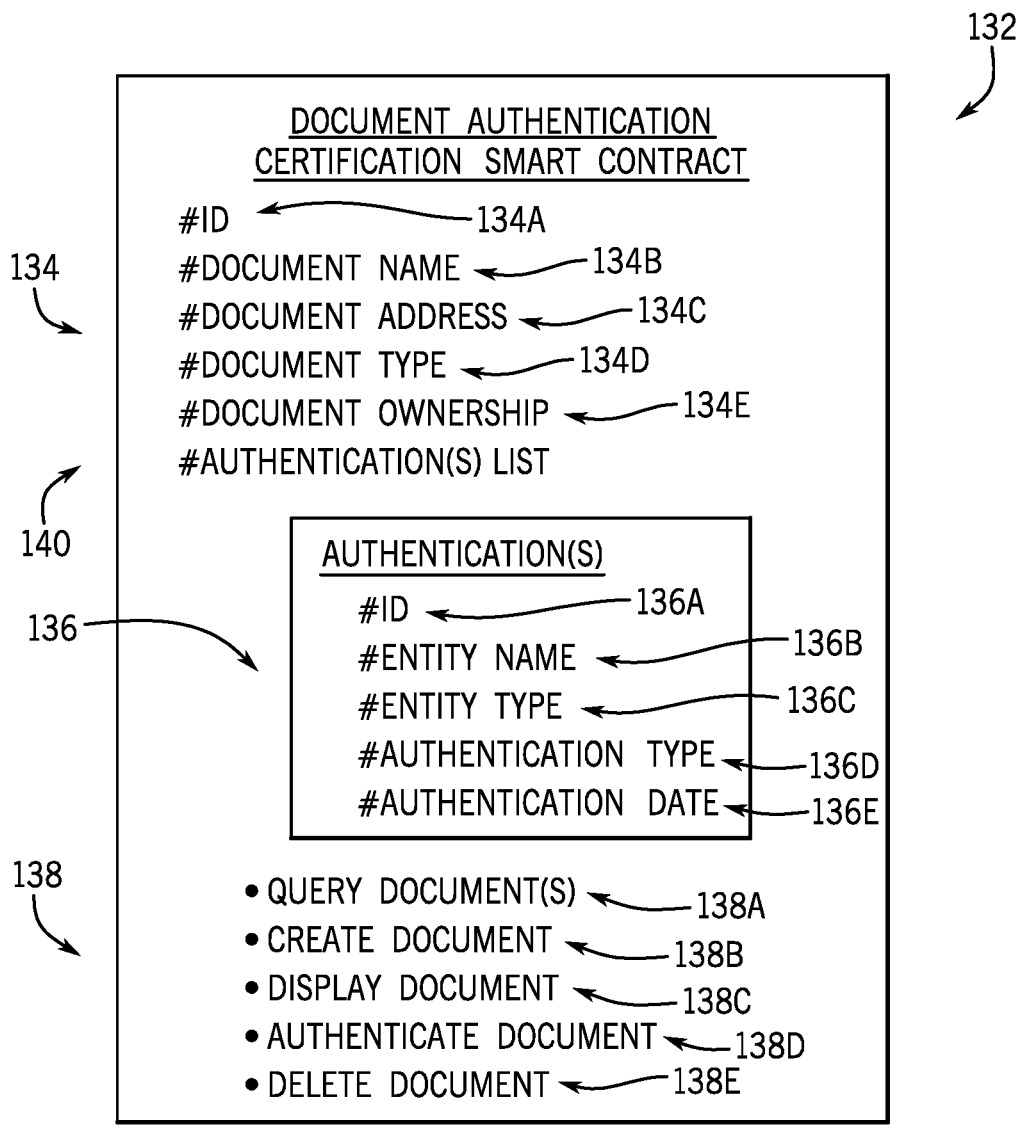
FIG. 4 illustrates an example data structure of a document authentication certification smart contract, in accordance with embodiments described herein.

The diagram 132 of FIG. 4 illustrates an example data structure of a document authentication certification smart contract 114, in accordance with the embodiments described herein. In certain embodiments, to store and perform transactions 118 and information requests 128, the document authentication certification smart contract 114 may include a series of states 134, a collection of authentication(s) 136, and a series of functions 138. For example, in certain embodiments, the document authentication certification smart contract 114 may have an identifier state 134A, which may be a unique identifier for the document authentication smart contract 114. In addition, in certain embodiments, the document authentication certification smart contract 114 may have a document name state 134B, a document address state 134C (e.g., indicating a link to an electronic version of a document 116), document type state 134D (e.g., a type of legal document, as listed above), and a document ownership state 134E. In addition, in certain embodiments, the document authentication certification smart contract 114 may have a collection of authentication(s) 136, which be indexed in an authentication list 140. In certain embodiments, each authentication 136 may have an identifier 136A, a name 136B and type 136C of the authenticating entity, and a type 136D and date 136E of the particular authentication 136.

In certain embodiments, the functions 138 present in document authentication certification smart contracts 114 may include methods to interact with the states 134. For example, in certain embodiments, the functions 138 may include a query document(s) function 138A, which may enable users 104 to perform a query for a specific document 116, or to perform a query for all documents 116 that match certain criteria (e.g., documents 116 of the same document type, documents 116 having common ownership, and so forth). In addition, in certain embodiments, the functions 138 may include a create document function 138B, which enables certain users 104 to create new instances of documents 116. In certain embodiments, only owners of particular documents 116 may be allowed to create new instances of documents 116. However, in certain other embodiments, other users 104 (e.g., authenticating entities) may be allowed to create new instances of documents 116. In addition, in certain embodiments, the functions 138 may include a display document function 138C, which enables user 104 to request that an image of a particular document 116 to, for example, be displayed via an application 106 running on a user device 102. In general, all users 104 that are authorized to view a particular document 116 may execute the display document function 138C. In addition, in certain embodiments, the functions 138 may include an authenticate document function 138D. In general, only authenticating entity users 104 may be allowed to authenticate documents 116 and, even then, may only be allowed to authenticate particular documents 116 when the document authentication certification smart contract 114 ascertains that the document 116 is in a "queue" of a particular authenticating entity user 104 (i.e., that the particular authenticating entity user 104 is currently the user for which an action is currently needed). In addition, in certain embodiments, the functions 138 may include a delete document function 138E. In certain embodiments, only owners of particular documents 116 may be allowed to delete documents 116. It will be appreciated that the example states 134, collection of authentication(s) 136, and functions 138 of the example data structure of a document authentication certification smart contract 114 illustrated in FIG. 4 are merely exemplary, and are not intended to be limiting.

Figure 5A:
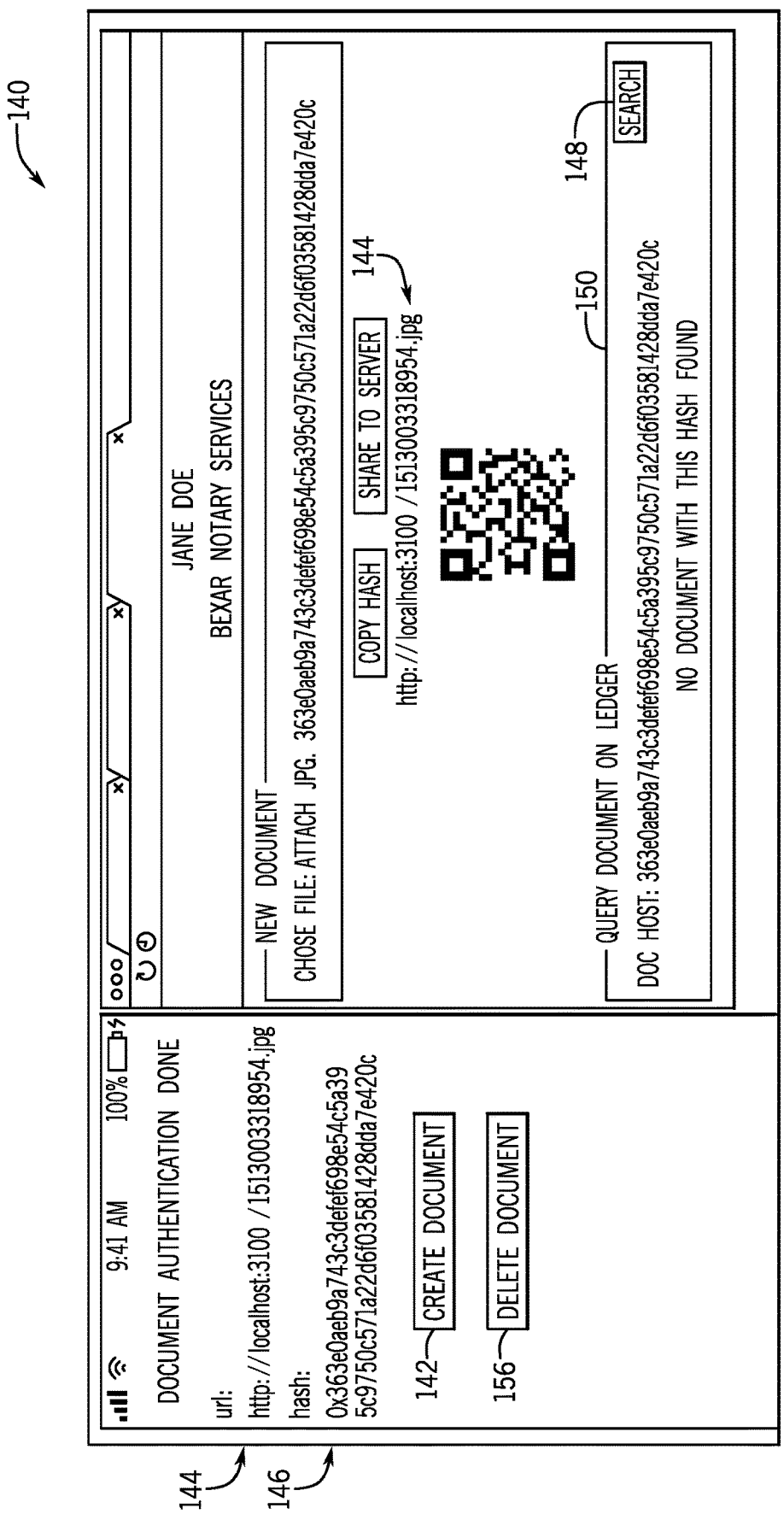
Figure 5B:
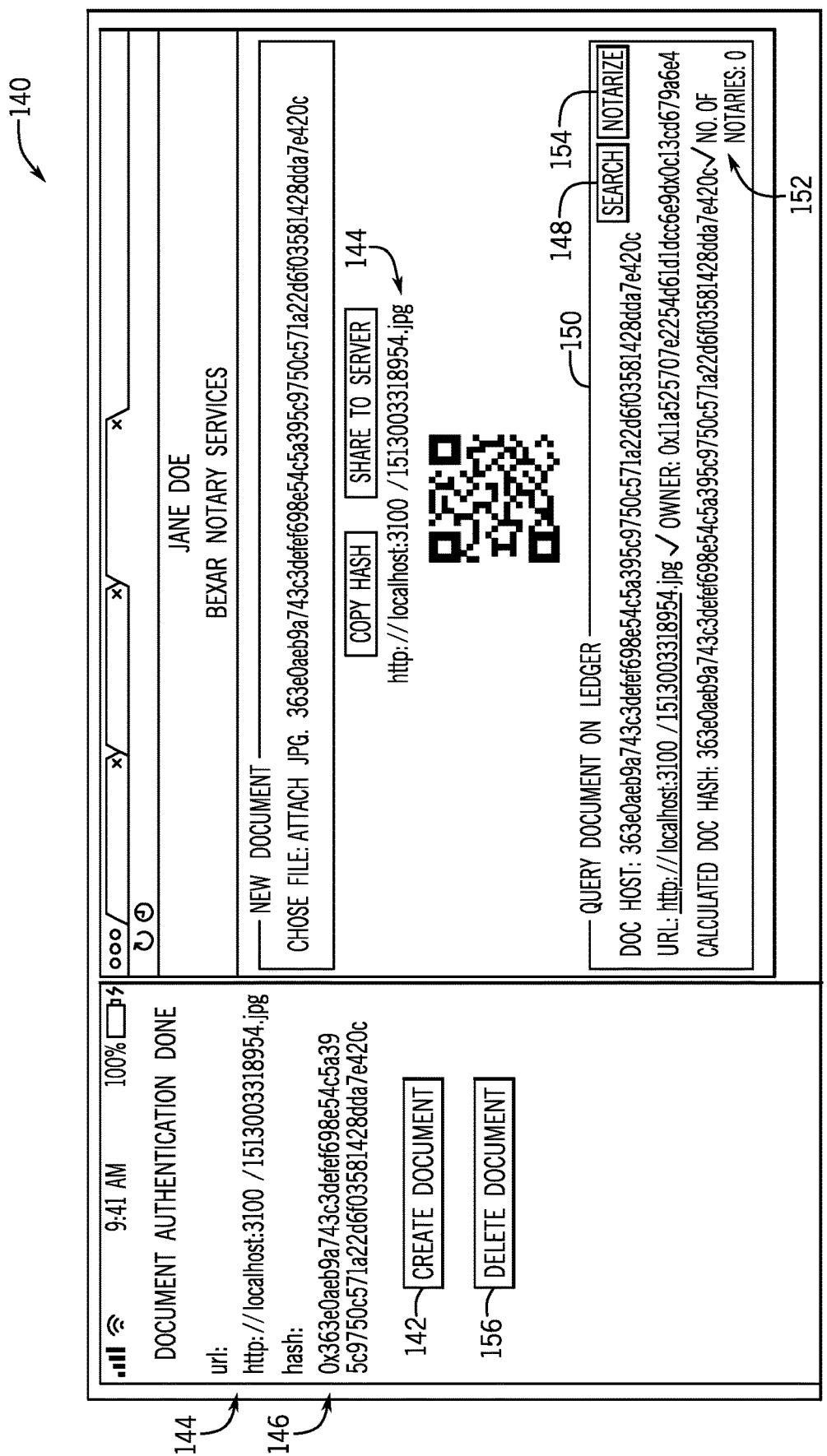

To further illustrate the functionality described herein, FIGS. 5A through 5F are depictions of an example user interface 140 that may facilitate interaction with the system 100, in accordance with the embodiments described herein. In particular, the user interface 140 may be displayed by the application 106, which may be accessed by users 104 via respective user devices 102, as described herein. For example, FIG. 5A depicts a view of the user interface 140 being accessed by Jane Doe, who is a notary public for Bexar Notary Services. As illustrated, this first user 104 is authorized to create new instances of documents 116 in the distributed ledger 110, and to query document(s) 116 in the distributed ledger 110. For example, as illustrated in FIG. 5A, when the first user 104 selects a "Create Document" button 142 to create a new instance of a document 116, the first user 104 may select an address 144 for (e.g., link to) the newly create instance of the document 116. In addition, a hash value 146 is created for the new document 116. Then, when the first user 104 clicks a "Search" button 148 to query for documents 116 in the distributed ledger 110, the newly created document 116 may show up in a query pane 150, and may show some appropriate statistic 152 for each of the documents 116 returned in the query (e.g., number of notarizations, in the illustrated embodiment). Also, in the embodiment illustrated in FIG. 5B, the first user 104 has an option to notarize the document 116 that showed up in the query pane 150 by selecting a "Notarize" button 154. In addition, in the embodiment illustrated in FIG. 5B, the first user 104 has the ability to delete a currently-selected document 116 by selecting a "Delete" button 156.

Figure 5C:
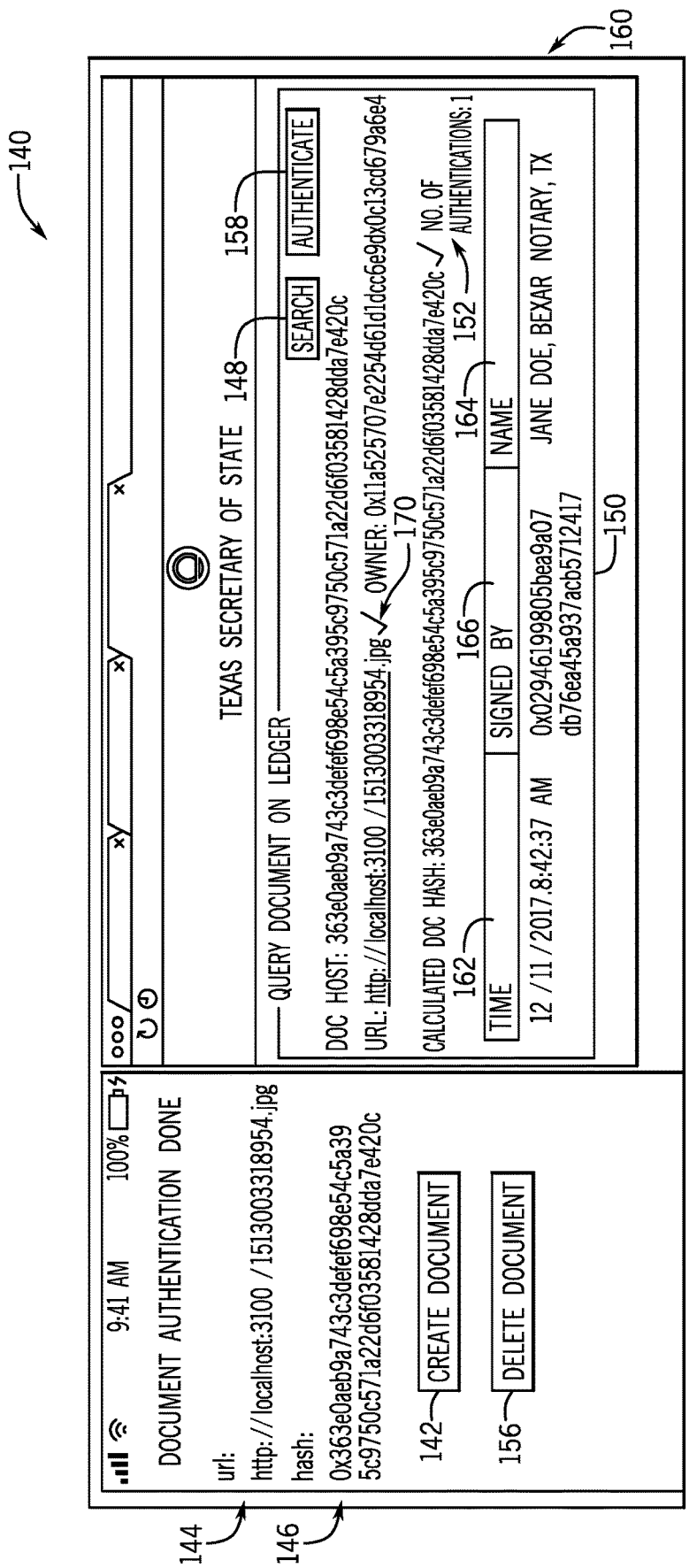

As a non-limiting example, once the first user 104 has notarized the document 116, possession of the document 116 may transfer to a second user 104, as determined by a document authentication certification smart contract 114. For example, as illustrated in FIG. 5C, once the first user 104 notarizes a particular document 116, the document 116 may appear in the query pane 150 for a second user 104 (e.g., a user associated with the Texas Secretary of State, in the illustrated embodiment). In certain embodiments, upon notarization of the particular document 116 by the first user 104, the document 116 may automatically appear in the query pane 150 for the second user 104 and, in certain embodiments, may prompt the second user 104 (e.g., by displaying a flashing symbol on the user interface 140, by activating an audible alarm via the application 106, and so forth) that the new document 116 is in the "queue" for the second user 104. Indeed, in certain embodiments, notarization of the particular document 116 by the first user 104 may cause a signal to be transmitted to a user application 106 for the second user 104 such that the user application 106 for the second user 104 is prompted to execute (e.g., open) on a user device 102 for the second user 104 without any manual input received by the user device 102 for the second user 104. In other words, the second user 104 may not even be required to interact with the application 106 to receive a notification that the newly created document 116 is in the "queue" for the second user 104. This functionality of the system 100 may substantially improve processing times for authentication certification of documents 116.

Figure 5D:
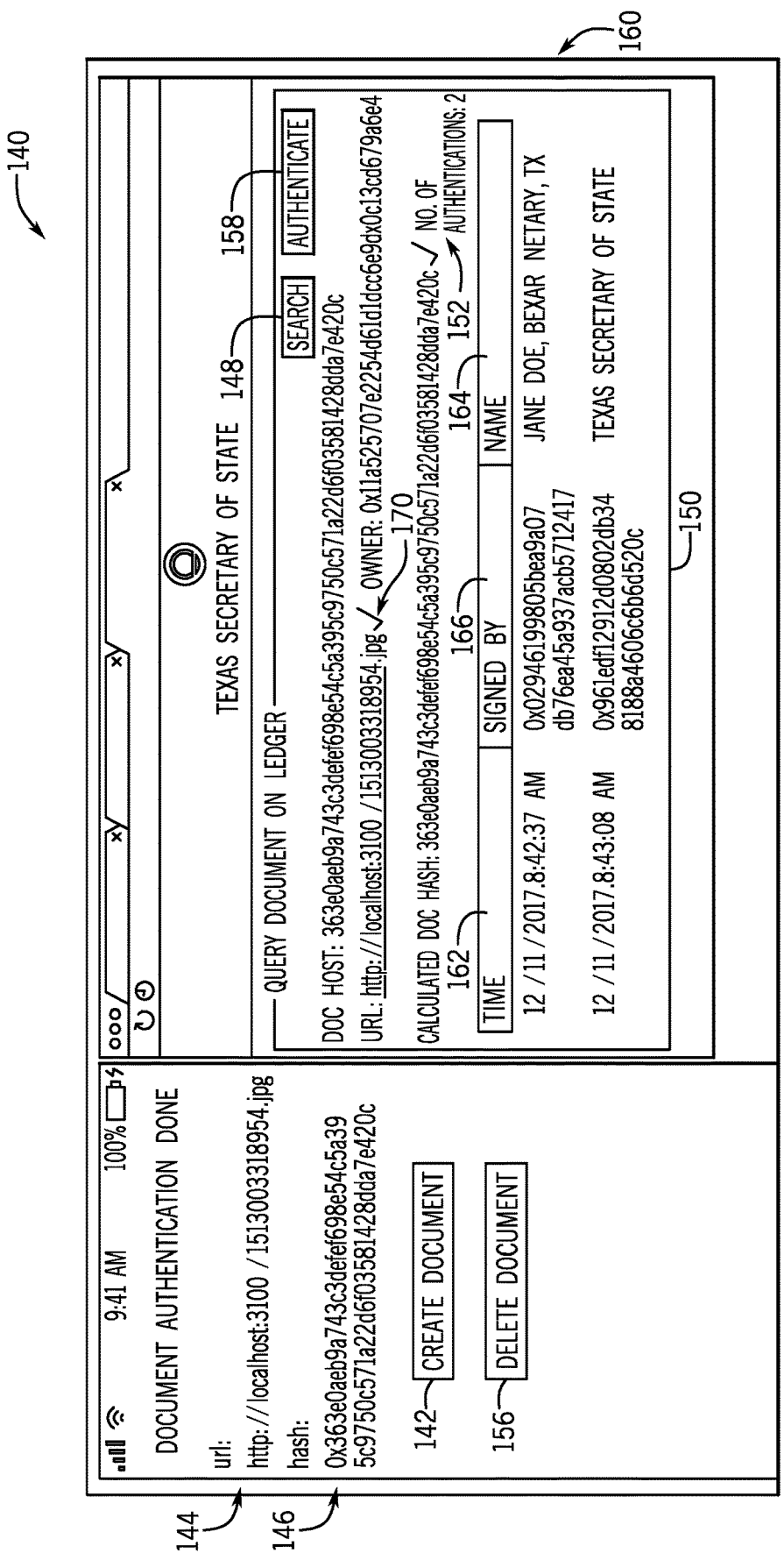

As illustrated in FIG. 5C, once the newly created document 116 shows up in the query pane 150 for the second user 104, the second user 104 may authenticate the currently-selected document 116 by selecting an "Authenticate" button 158. Once the second user 104 has authenticated the notarization of the document 116, both signatures for the document 116 are included in a list 160 of signatures, which includes the time 162 of the signatures, the name 164 of the signer, and a hash value 166 for the particular signature, as illustrated in FIG. 5D.

Figure 5E:
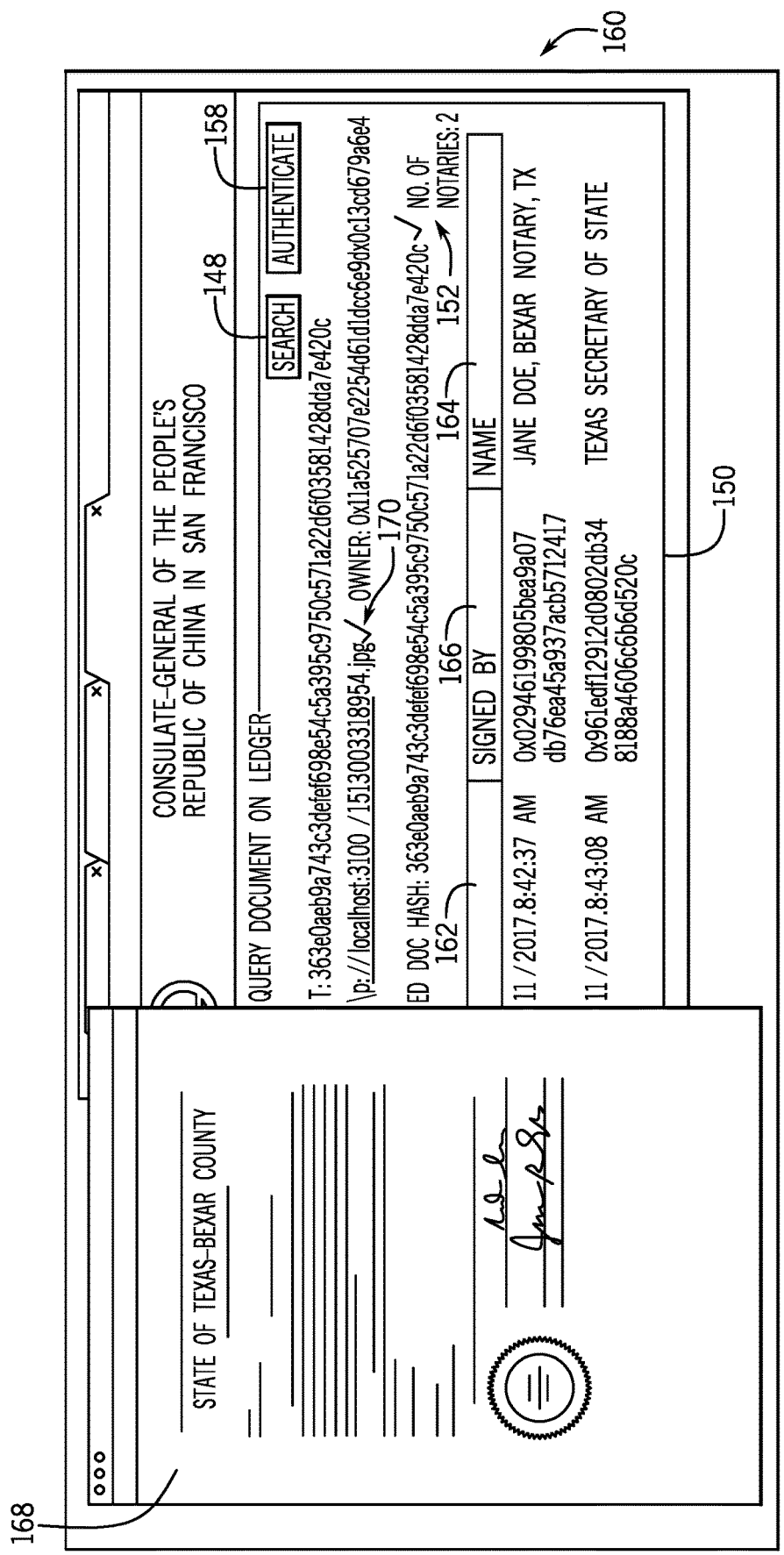

In certain embodiments, any number of users 104 (e.g., legal entities) may be involved in the authentication certification histories for any given type of document 116, as determined by a particular document authentication certification smart contract 114. For example, as illustrated in FIG. 5E, a third user 104 may be involved in the processing of the document 116 being discussed with respect to FIGS. 5A through 5D. In particular, for this particular type of document 116, the document authentication certification smart contract 114 determines that the Consulate-General of the People's Republic of China in San Francisco is required as an authenticating entity for the particular document 116. As illustrated in FIG. 5E, the third user 104 may display an image 168 of the particular document 116 within the user interface 140 by, for example, clicking on a hyperlink 170 (e.g., the URL) that relates to an address for (e.g., link to) an electronic version of the document 116. Once the newly created document 116 shows up in the query pane 150 for the third user 104, the third user 104 may also authenticate the currently-selected document 116 by selecting the "Authenticate" button 158. Once the third user 104 has also authenticated the notarization of the document 116, all of the signatures for the document 116 are included in the list 160 of signatures, as illustrated in FIG. 5F.

Figure 6:
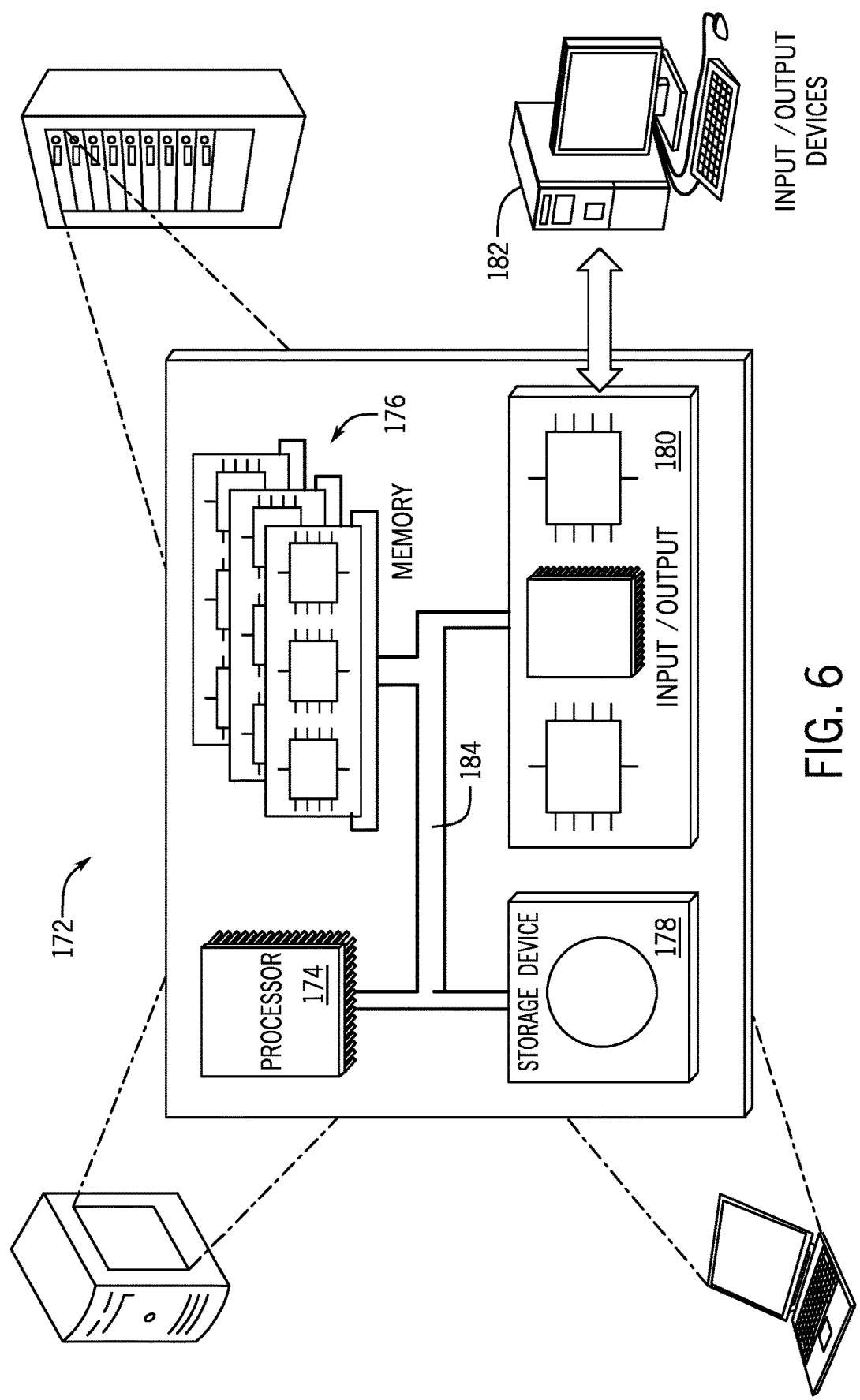
FIG. 6 illustrates a block diagram of a computing system for enabling the system described herein, in accordance with embodiments described herein.

FIG. 6 illustrates a block diagram of a computing system 172 for enabling the system 100 described herein, in accordance with the embodiments described herein. The system 172 may be used for one or more of the operations described with respect to the various embodiments discussed herein. For example, the system 172 may be included, at least in part, in one or more of user device(s) 102, the distributed ledger system(s) 108, or other computing device(s) described herein. The system 172 may include one or more processors 174, a memory 176, one or more storage devices 178, and one or more input/output (I/O) devices 182 controllable through one or more I/O interfaces 180. The various components 174, 176, 178, 180, or 182 may be interconnected through at least one system bus 184, which may enable the transfer of data between the various modules and components of the system 172.

The processor(s) 174 may be configured to process instructions for execution within the system 172. The processor(s) 174 may include single-threaded processor(s), multi-threaded processor(s), or both. The processor(s) 174 may be configured to process instructions stored in the memory 176 or on the storage device(s) 178. The processor(s) 174 may include hardware-based processor(s) each including one or more cores. The processor(s) 174 may include general purpose processor(s), special purpose processor(s), or both.

The memory 176 may store information within the system 172. In certain embodiments, the memory 176 includes one or more computer-readable media. The memory 176 may include any suitable number of volatile memory units and/or non-volatile memory units. The memory 176 may include read-only memory, random access memory, or both. In some examples, the memory 176 may be employed as active or physical memory by one or more executing software modules.

The storage device(s) 178 may be configured to provide (e.g., persistent) mass storage for the system 172. In certain embodiments, the storage device(s) 178 may include one or more computer-readable media. For example, the storage device(s) 178 may include a floppy disk device, a hard disk device, an optical disk device, or a tape device. The storage device(s) 178 may include read-only memory, random access memory, or both. The storage device(s) 178 may include one or more of an internal hard drive, an external hard drive, or a removable drive.

One or both of the memory 176 or the storage device(s) 178 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 172. In certain embodiments, the CRSM may include a data store that provides storage of computer-readable instructions or other information in a non-transitory format. The CRSM may be incorporated into the system 172 or may be external with respect to the system 172. The CRSM may include read-only memory, random access memory, or both. One or more CRSM suitable for tangibly embodying computer program instructions and data may include any suitable type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 174 and the memory 176 may be supplemented by, or incorporated into, one or more application-specific integrated circuits (ASICs).

The system 172 may include one or more I/O devices 182. The I/O device(s) 182 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 182 may also include one or more output devices such as a display, LED(s), an audio output device (e.g., a speaker), a printer, a haptic output device, and so forth. The I/O device(s) 182 may be physically incorporated in one or more computing devices of the system 172, or may be external with respect to one or more computing devices of the system 172.

The system 172 may include one or more I/O interfaces 180 to enable components or modules of the system 172 to control, interface with, or otherwise communicate with the I/O device(s) 182. The I/O interface(s) 180 may enable information to be transferred in or out of the system 172, or between components of the system 172, through serial communication, parallel communication, or other types of communication. For example, the I/O interface(s) 180 may comply with a version of the RS-232 standard for serial ports, or with a version of the IEEE 1284 standard for parallel ports. As another example, the I/O interface(s) 180 may be configured to provide a connection over Universal Serial Bus (USB) or Ethernet. In some examples, the I/O interface(s) 180 may be configured to provide a serial connection that is compliant with a version of the IEEE 1394 standard.

The I/O interface(s) 180 may also include one or more network interfaces that enable communications between computing devices in the system 172, and/or between the system 172 and other network-connected computing systems. The network interface(s) may include one or more network interface controllers (NICs) or other types of transceiver devices configured to send and receive communications over one or more networks using any suitable network protocol.

Computing devices of the system 172 may communicate with one another, or with other computing devices, using one or more networks. Such networks may include public networks such as the internet, private networks such as an institutional or personal intranet, or any combination of private and public networks. The networks may include any suitable type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In certain embodiments, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 172 may include one or more computing devices of any suitable type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), certain embodiments are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Certain embodiments and all of the functional operations described in this specification may be realized in digital electronic circuitry, or in computer software, firmware, or hardware, including the structures disclosed in this specification and their structural equivalents, or in combinations of one or more of them. Certain embodiments may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and/or processor(s) of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, certain embodiments may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Certain embodiments may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While only certain features of the disclosure have been illustrated and described herein, many modifications and changes will occur to those skilled in the art. For example, while the embodiments described herein include a specific logic organization for data structures and libraries, such as smart contracts and APIs, substantially similar benefits provided by the present invention may be obtained by trivial structural alterations such as changes in name or in non-substantial changes to the mode of operation of the data structures. It is, thus, to be understood that the appended claims are intended to cover all such modifications and changes as fall within the true spirit of the invention.

The invention claimed is:

1. A blockchain node of a blockchain system, comprising:
a blockchain replicate; and
blockchain mining instructions that cause processing circuitry of the blockchain node to replicate a blockchain, perform requested data insertion into the blockchain replicate, perform requested transactions stored in the blockchain replicate, and perform a consensus mechanism of the blockchain system; and
wherein the blockchain replicate comprises a document authentication certification smart contract configured to facilitate insertion of data relating to one or more documents stored in the blockchain, and to verify one or more authentication certifications for the one or more documents stored in the blockchain, wherein the one or more authentication certifications for the one or more documents are provided by an authoritative legal entity, wherein the one or more documents comprise one or more legal documents to be certified by the authoritative legal entity, and wherein the data comprises the one or more authentication certifications for the one or more documents provided by the authoritative legal entity.

2. The blockchain node of claim 1, wherein the document authentication certification smart contract is configured to facilitate information requests relating to the one or more documents.

3. The blockchain node of claim 1, wherein the document authentication certification smart contract is configured to facilitate querying of the one or more documents.

4. The blockchain node of claim 1, wherein the document authentication certification smart contract is configured to facilitate creation of a document of the one or more documents.

5. The blockchain node of claim 1, wherein the document authentication certification smart contract is configured to facilitate display of a document of the one or more documents.

6. The blockchain node of claim 1, wherein the document authentication certification smart contract is configured to facilitate authentication of a document of the one or more documents.

7. The blockchain node of claim 1, wherein the document authentication certification smart contract is configured to facilitate deletion of a document of the one or more documents.

8. The blockchain node of claim 1, wherein the data comprises an identifier for a document, a name of the document, an address of the document, a type of the document, and ownership of the document.

9. The blockchain node of claim 1, wherein the data comprises an identifier for an authentication of a document, a name of an entity authenticating the document, a type of the entity authenticating the document, a type of the authentication, and a date of the authentication.

10. The blockchain node of claim 1, wherein the one or more documents comprise electronic documents.

11. The blockchain node of claim 1, wherein the authoritative legal entity comprises a notary public, a state department, a foreign consulate or embassy, or another government entity.

12. A non-transitory computer readable medium comprising instructions for an access node of a blockchain system, wherein the instructions are configured to:
cause processing circuitry of the access node to create a document authentication certification smart contract; and
wherein the document authentication certification smart contract is configured to facilitate insertion of data relating to one or more documents stored in a blockchain of the blockchain system, and to verify one or more authentication certifications for the one or more documents stored in the blockchain of the blockchain system, wherein the one or more authentication certifications for the one or more documents are provided by an authoritative legal entity, wherein the one or more documents comprise one or more legal documents to be certified by the authoritative legal entity, and wherein the data comprises the one or more authentication certifications for the one or more documents provided by the authoritative legal entity.

13. The non-transitory computer readable medium of claim 12, wherein the document authentication certification smart contract is configured to facilitate information requests relating to the one or more documents.

14. The non-transitory computer readable medium of claim 12, wherein the document authentication certification smart contract is configured to facilitate querying of the one or more documents.

15. The non-transitory computer readable medium of claim 12, wherein the document authentication certification smart contract is configured to facilitate creation of a document of the one or more documents.

16. The non-transitory computer readable medium of claim 12, wherein the document authentication certification smart contract is configured to facilitate display of a document of the one or more documents.

17. The non-transitory computer readable medium of claim 12, wherein the document authentication certification smart contract is configured to facilitate authentication of a document of the one or more documents.

18. The non-transitory computer readable medium of claim 12, wherein the document authentication certification smart contract is configured to facilitate deletion of a document of the one or more documents.

19. The non-transitory computer readable medium of claim 12, wherein the data comprises an identifier for a document, a name of the document, an address of the document, a type of the document, and ownership of the document.

20. The non-transitory computer readable medium of claim 12, wherein the data comprises an identifier for an authentication of a document, a name of an entity authenticating the document, a type of the entity authenticating the document, a type of the authentication, and a date of the authentication.

21. The non-transitory computer readable medium of claim 12, wherein the one or more documents comprise electronic documents.

22. The non-transitory computer readable medium of claim 12, wherein the one or more documents comprise legal documents.

* * * * *